United States Patent
Tanaka

(10) Patent No.: US 10,063,946 B2
(45) Date of Patent: Aug. 28, 2018

(54) SIGNAL TRANSMISSION DEVICE AND SIGNAL TRANSMISSION METHOD

(71) Applicant: Mitsubishi Electric Corporation, Chiyoda-ku (JP)

(72) Inventor: Mamiko Tanaka, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/545,765

(22) PCT Filed: Mar. 4, 2015

(86) PCT No.: PCT/JP2015/056289
§ 371 (c)(1),
(2) Date: Jul. 24, 2017

(87) PCT Pub. No.: WO2016/139767
PCT Pub. Date: Sep. 9, 2016

(65) Prior Publication Data
US 2018/0014095 A1   Jan. 11, 2018

(51) Int. Cl.
*H04Q 11/00*  (2006.01)
*H04B 10/50*  (2013.01)
(Continued)

(52) U.S. Cl.
CPC ......... *H04Q 11/0005* (2013.01); *H04B 10/50* (2013.01); *H04B 10/69* (2013.01);
(Continued)

(58) Field of Classification Search
CPC ....... H04Q 11/0005; H04Q 2011/0016; H04Q 2011/0039; H04B 10/50; H04B 10/69; H04J 14/02
See application file for complete search history.

(56) References Cited

U.S. PATENT DOCUMENTS

2010/0098411 A1   4/2010   Nakashima et al.
2010/0322632 A1*  12/2010  Way .................. H04B 10/5167
                                                          398/79
(Continued)

FOREIGN PATENT DOCUMENTS

JP   2010-98617 A   4/2010
JP   2012-90096 A   5/2012
(Continued)

OTHER PUBLICATIONS

International Search Report dated Apr. 7, 2015 in PCT/JP2015/056289 filed Mar. 4, 2015.
(Continued)

*Primary Examiner* — Shi K Li
*Assistant Examiner* — Mina Shalaby
(74) *Attorney, Agent, or Firm* — Oblon, McClelland, Maier & Neustadt, L.L.P.

(57) ABSTRACT

A transponder includes a multiplexing section, optical transmitters, optical receivers, an extracting section, and a warning monitor section, wherein the extracting section includes a first signal extracting unit for extracting reception data, a second signal extracting unit for extracting reception data, and a reception signal switching section. When carrier signals are in a link-establishable state, the reception signal switching section supplies reception electric signals generated by the optical receivers to the first signal extracting unit and outputs the reception data. When a carrier signal is in a non-link-establishable state, the reception signal switching section supplies a reception electric signal generated by an optical receiver using a carrier signal in the link-establishable state to the second signal extracting unit and outputs the reception data extracted by the second signal extracting unit.

11 Claims, 6 Drawing Sheets

(51) Int. Cl.
*H04B 10/69* (2013.01)
*H04J 14/02* (2006.01)

(52) U.S. Cl.
CPC ...... *H04J 14/02* (2013.01); *H04Q 2011/0016* (2013.01); *H04Q 2011/0039* (2013.01)

(56) References Cited

U.S. PATENT DOCUMENTS

2014/0369677 A1* 12/2014 Tanaka .................. H04B 10/50
 398/25
2015/0280854 A1* 10/2015 Matsukawa ........... H04J 14/022
 398/3

FOREIGN PATENT DOCUMENTS

| JP | 2012-527822 A | 11/2012 |
| JP | 2014-220575 A | 11/2014 |
| JP | 2015-162681 A | 9/2015 |
| WO | 2013/136512 A1 | 9/2013 |

OTHER PUBLICATIONS

Japanese Office Action dated Jan. 30, 2018 in Japanese Patent Application No. 2017-503266 (with unedited computer generated English translation), citing document AO therein, 6 pages.

\* cited by examiner

SIGNAL TRANSMISSION DEVICE AND SIGNAL TRANSMISSION METHOD

TECHNICAL FIELD

The present invention relates to a signal transmission device and a signal transmission method used in an optical transmission system employing a multi-carrier system, and in particular, to a signal transmission device and a signal transmission method with which the traffic can be partially continued even when any of a plurality of carrier signals has fallen into a non-link-establishable state.

BACKGROUND ART

In recent years, with the increase in the demand for information communication, increasing the optical transmission capacity is being requested; however, the increasing demand for information communication cannot be met sufficiently only by increasing the wavelength multiplexing number and newly laying fiber-optic networks. Thus, it is being requested to increase the data transmission rate per carrier signal from 10 Gbps (Gigabits per second) to 40 Gbps or 100 Gbps. However, especially in optical transmission systems performing long-distance transmission, transmission penalties such as distortion of the optical signal waveform due to chromatic dispersion (CD) and polarization mode dispersion (PMD) of the optical fiber as the communication channel become marked with the increase in the data transmission rate.

Communication methods capable of compensating for the influence of such transmission penalties (chromatic dispersion and polarization mode dispersion) by signal processing performed by a digital signal processor of an optical signal reception device and also dealing with various types of multilevel modulation methods have come into practical use. For example, there have been proposed methods employing multilevel modulation such as Dual Polarization-Quadrature Phase Shift Keying (DP-QPSK) and Dual Polarization-Binary Phase Shift Keying (DP-BPSK) as digital coherent communication methods (see Patent Reference 1, for example).

There has also been proposed a multi-carrier system in which one transponder includes a plurality of optical transmission/reception units and data are transmitted by using a plurality of carrier signals having wavelengths different from each other. In cases where the number of the carrier signals is N (N is an integer larger than or equal to 2), one transponder includes N transmission/reception units and data are transmitted by using N carrier signals having wavelengths different from each other.

PRIOR ART REFERENCE

Patent Reference

Patent Reference 1: Japanese Patent Application Publication No. 2010-98617

SUMMARY OF THE INVENTION

Problem to Be Solved By the Invention

However, there is a problem in that when N transmission electric signals (e.g., N=2) are generated by multiplexing M pieces of client transmission data (e.g., M=10) and the N transmission electric signals are transmitted by using N carrier signals, an abnormality occurring in even only one of the N carrier signals affects all the M pieces of client transmission data and the entire traffic on the client side is interrupted.

It is therefore an object of the present invention, which has been made to resolve the above-described problem with the conventional art, to provide a signal transmission device and a signal transmission method with which the traffic can be partially continued by using a carrier signal in a link-establishable state when any of a plurality of carrier signals is in the non-link-establishable state.

Means for Solving the Problem

A signal transmission device according to the present invention includes a plurality of optical receivers that generate reception electric signals from a plurality of reception optical signals respectively including a plurality of carrier signals, an extracting section that extracts reception data from the reception electric signals, and a monitoring section that sends a notification signal for notifying of a carrier signal in a non-link-establishable state to the extracting section when any of the plurality of carrier signals is in the non-link-establishable state. The extracting section includes a first signal extracting unit that extracts the reception data from the reception electric signals at a first data transmission rate when a data transmission rate by the plurality of reception optical signals is the first data transmission rate, a second signal extracting unit that extracts the reception data from the reception electric signals at a second data transmission rate lower than the first data transmission rate when the data transmission rate by the plurality of reception optical signals is the second data transmission rate, and a reception signal switching section. When the plurality of carrier signals of the plurality of reception optical signals are in a link-establishable state, the reception signal switching section supplies the reception electric signals generated by the plurality of optical receivers to the first signal extracting unit and outputs the reception data extracted by the first signal extracting unit. When any of the plurality of carrier signals of the plurality of reception optical signals is in the non-link-establishable state, the reception signal switching section supplies the reception electric signals generated by the optical receivers using a carrier signal in the link-establishable state among the plurality of carrier signals of the reception optical signals to the second signal extracting unit and outputs the reception data extracted by the second signal extracting unit.

Another signal transmission device according to the present invention includes a multiplexing section that multiplexes transmission data and thereby generates a transmission electric signal, a plurality of optical transmitters that generate a plurality of transmission optical signals respectively including a plurality of carrier signals by using the transmission electric signal, and a monitoring section that sends a notification signal for notifying of a carrier signal in a non-link-establishable state to the multiplexing section when any of the plurality of carrier signals of the plurality of transmission optical signals is in the non-link-establishable state. The multiplexing section includes a first signal multiplexing unit that generates the transmission electric signal having a first data transmission rate when a data transmission rate by the plurality of transmission optical signals is the first data transmission rate, a second signal multiplexing unit that generates the transmission electric signal having a second data transmission rate lower than the first data transmission rate when the data transmission rate by the plurality of transmission optical signals is the second data transmission rate, and a transmission signal switching section. When the plurality of carrier signals of the plurality of transmission optical signals are in a link-establishable state, the transmission signal switching section supplies the transmission data to the first signal multiplexing unit, divides the transmission electric signal generated by the first signal multiplexing unit, and supplies the divided transmission electric signals to the plurality of optical transmitters. When any of the plurality of carrier signals of the plurality of transmission optical signals is in the non-link-establishable state, the transmission signal switching section supplies the transmission data to the second signal multiplexing unit and supplies the transmission electric signal generated by the second signal multiplexing unit to one or more optical transmitters using a carrier signal in the link-establishable state among the plurality of carrier signals.

Effects of the Invention

According to the present invention, when one of a plurality of carrier signals is in the non-link-establishable state, the traffic can be partially continued by using a carrier signal in the link-establishable state among the plurality of carrier signals. Accordingly, an advantageous effect is achieved in that the stoppage (interruption) of the entire traffic can be avoided when abnormality in an optical transmission system has occurred only to part of the carrier signals.

MODE FOR CARRYING OUT THE INVENTION

Embodiments of the present invention will be described in detail below with reference to drawings. It should be noted that the present invention is not restricted to first and second embodiments and modifications described below.

<1> First Embodiment

<1-1> Configuration of First Embodiment

Figure 1:
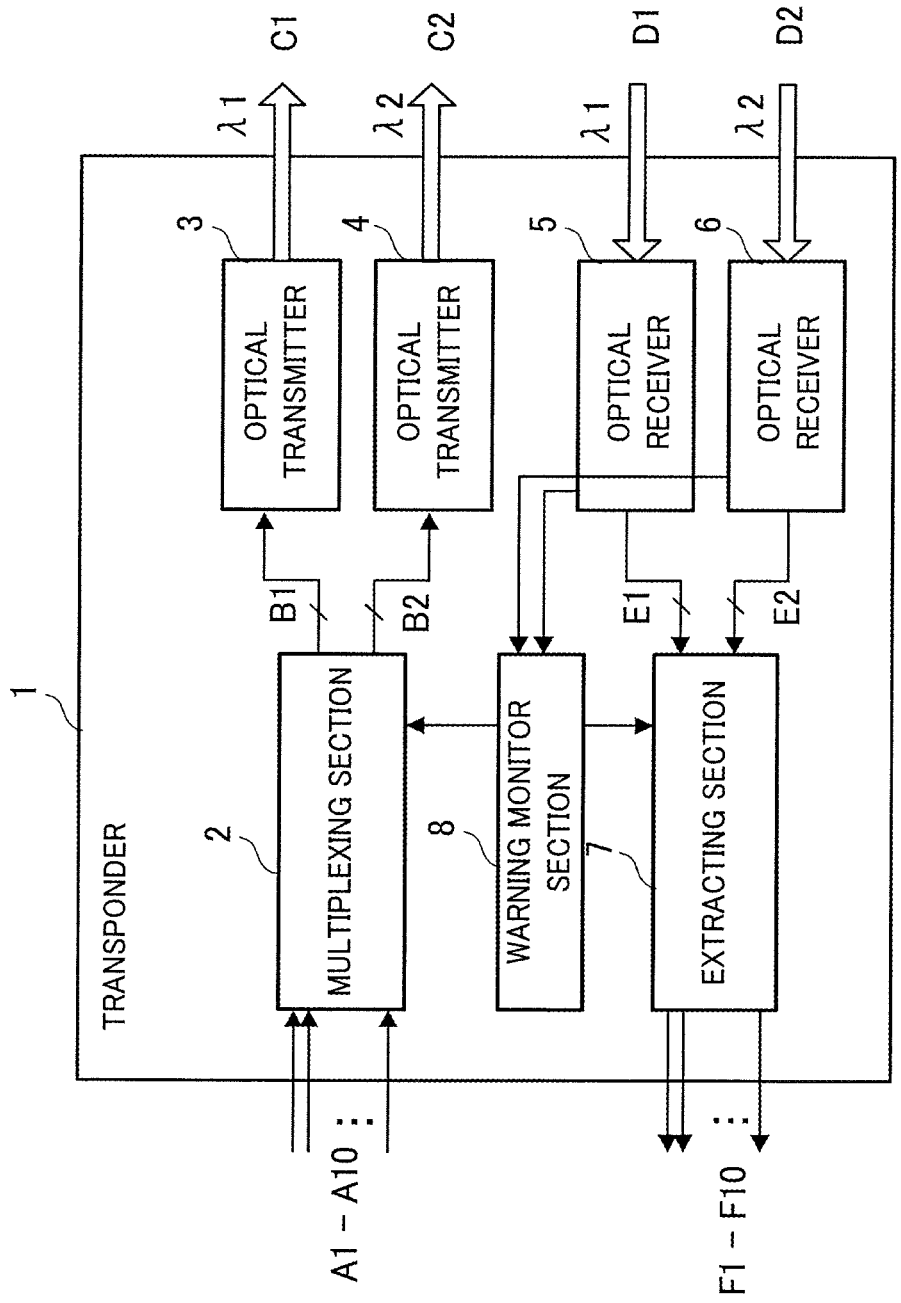
FIG. 1 is a block diagram schematically showing a configuration of a transponder as a signal transmission device according to a first embodiment of the present invention.

FIG. 1 is a diagram schematically showing a configuration of a transponder 1 as a signal transmission device employing the multi-carrier system according to a first embodiment of the present invention. As shown in FIG. 1, the transponder 1 includes a multiplexing section (client transmission data multiplexing section) 2, a plurality of optical transmitters (optical transmission units) 3 and 4 that output optical signals having wavelengths different from each other, a plurality of optical receivers (optical reception units) 5 and 6 that receive optical signals having wavelengths different from each other, an extracting section (client reception data extracting section) 7, and a warning monitor section 8 as a monitoring section that monitors abnormality in carrier signals.

The multiplexing section 2 generates transmission electric signals B1 and B2 by multiplexing client transmission data A1-A10 as multiple pieces of transmission data. However, the number of pieces of the client transmission data is not limited to ten and can be a number other than ten. Further, the number of the transmission electric signals to which the multiplexed signal is distributed is not limited to two and can be three or more.

The optical transmitters 3 and 4 generate transmission optical signals C1 and C2 respectively including carrier signals (a plurality of carrier signals) having wavelengths different from each other by using the transmission electric signals B1 and B2 and output the transmission optical signals C1 and C2. Each optical transmitter modulates the carrier signal, based on the transmission electric signal, and outputs the modulated carrier signal as the transmission optical signal. In the first embodiment, the data transmission rate of each optical signal outputted by the optical transmitters 3 and 4 is 50 Gbps and data is transmitted by the two transmission optical signals C1 and C2 at a data transmission rate of 100 Gbps. However, the number of the optical transmitters is not limited to two and can be three or more. In FIG. 1, the wavelength of the carrier signal of the transmission optical signal C1 is λ1 and the wavelength of the carrier signal of the transmission optical signal C2 is λ2.

The optical receivers 5 and 6 generate reception electric signals E1 and E2 from reception optical signals D1 and D2 including carrier signals (a plurality of carrier signals) having wavelengths different from each other. Each optical receiver demodulates the reception optical signal and thereby generates a signal (reception electric signal) transmitted by a carrier signal. However, the number of the optical receivers is not limited to two and can be three or more. Further, the number of the reception optical signals D1 and D2 is not limited to two and can be three or more. In FIG. 1, the wavelength of the carrier signal of the reception optical signal D1 is λ1 and the wavelength of the carrier signal of the reception optical signal D2 is λ2.

The extracting section 7 extracts client reception data F1-F10 as multiple pieces of reception data from the reception electric signals E1 and E2 and outputs the extracted client reception data F1-F10. However, the number of pieces of the client reception data is not limited to ten and can be a number other than ten. Further, the number of the multiplexed reception electric signals is not limited to two and can be three or more.

The warning monitor section 8 sends a notification signal for notifying of the carrier signal of one of the reception optical signals D1 and D2 that is in a non-link-establishable state to the extracting section 7 (a switching control unit 75 shown in FIG. 3 which will be explained later) and the multiplexing section 2 (a switching control unit 25 shown in FIG. 2 which will be explained later) when either of the reception optical signals D1 and D2 respectively including carrier signals having wavelengths different from each other is abnormal (in the non-link-establishable state). Further, the warning monitor section 8 may detect the abnormality of a carrier signal by receiving a warning signal regarding the reception optical signals D1 and D2 or receiving a warning signal from an opposite device opposite to the transponder 1. The method employed by the warning monitor section 8 for detecting the abnormality of a carrier signal is not limited to the above examples.

Figure 2:
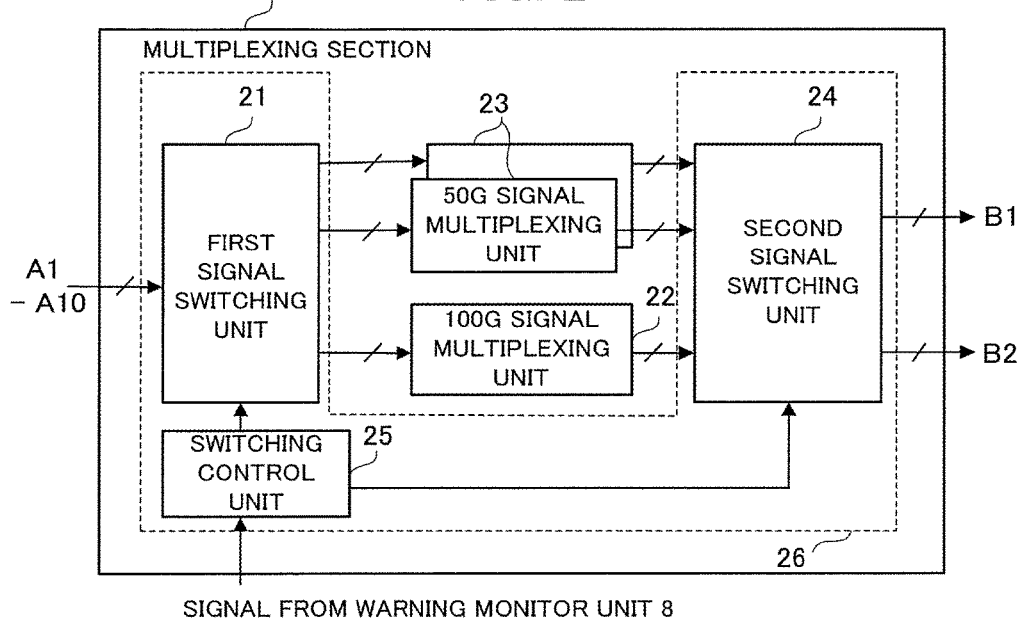
FIG. 2 is a block diagram schematically showing a configuration of a multiplexing section in FIG. 1.

FIG. 2 is a block diagram schematically showing a configuration of the multiplexing section 2 in FIG. 1. As shown in FIG. 2, the multiplexing section 2 includes a first signal multiplexing unit 22 that multiplexes the ten pieces of 10 Gbps client transmission data A1-A10, a plurality of second signal multiplexing units 23 that multiplex the client transmission data A1-A5 and the client transmission data A6-A10, and a transmission signal switching section 26. In FIG. 2, the plurality of second signal multiplexing units 23 are a pair of (i.e., two) signal multiplexing units 23.

The first signal multiplexing unit 22 multiplexes the client transmission data A1-A10 and outputs a multiplexed signal (100G signal) having a first data transmission rate (100 Gbps). The first signal multiplexing unit 22 is also referred to as a 100G signal multiplexing unit 22. In the second signal multiplexing units 23, one of the pair of signal multiplexing units multiplexes the client transmission data A1-A5 and the other of the pair of signal multiplexing units multiplexes the client transmission data A6-A10. Each of the pair of signal multiplexing units 23 outputs a multiplexed signal (50G signal) having a second data transmission rate (50 Gbps). The second signal multiplexing units 23 are also referred to as 50G signal multiplexing units 23. Incidentally, the first data transmission rate and the second data transmission rate are not limited to the above examples. Further, the number of the 100G signal multiplexing units 22 and the number of the 50G signal multiplexing units 23 are not limited to the above examples. Furthermore, the correspondence between the client transmission data A1-A10 and the pair of signal multiplexing units is not limited to the above example.

The transmission signal switching section 26 includes a first signal switching unit 21, a second signal switching unit 24, and a switching control unit 25.

When both of the carrier signals of the reception optical signals D1 and D2 are in a link-establishable state (that is, when both of the carrier signal having the wavelength λ1 and the carrier signal having the wavelength λ2 are in the link-establishable state), the first signal switching unit 21 supplies the client transmission data A1-A10 to the 100G signal multiplexing unit 22, based on a control signal from the switching control unit 25, and the second signal switching unit 24 generates the transmission electric signals B1 and B2 by dividing the multiplexed signal generated by the 100G signal multiplexing unit 22, based on a control signal from the switching control unit 25, and outputs the transmission electric signals B1 and B2 respectively to the optical transmitters 3 and 4.

When either of the carrier signals of the reception optical signals D1 and D2 is in the non-link-establishable state (abnormal) (that is, when either the carrier signal having the wavelength λ1 or the carrier signal having the wavelength λ2 is in the non-link-establishable state (abnormal)), the first signal switching unit 21 supplies the client transmission data A1-A5 to one of the pair of 50G signal multiplexing units 23 and supplies the client transmission data A6-A10 to the other one of the pair of 50G signal multiplexing units 23, based on a control signal from the switching control unit 25. In this case, the second signal switching unit 24 outputs the multiplexed signal generated by one of the pair of 50G signal multiplexing units 23 as the transmission electric signal B1 to the optical transmission unit 3, and outputs the multiplexed signal generated by the other one of the pair of 50G signal multiplexing units 23 as the transmission electric signal B2 to the optical transmission unit 4, based on a control signal from the switching control unit 25. For example, the second signal switching unit 24 outputs the transmission electric signal B1 to the optical transmitter 3 that uses the carrier signal having the wavelength λ1 and is in the link-establishable state, and outputs the transmission electric signal B2 to the optical transmitter 4 that uses the carrier signal having the wavelength λ2 and is in the non-link-establishable state.

Figure 3:
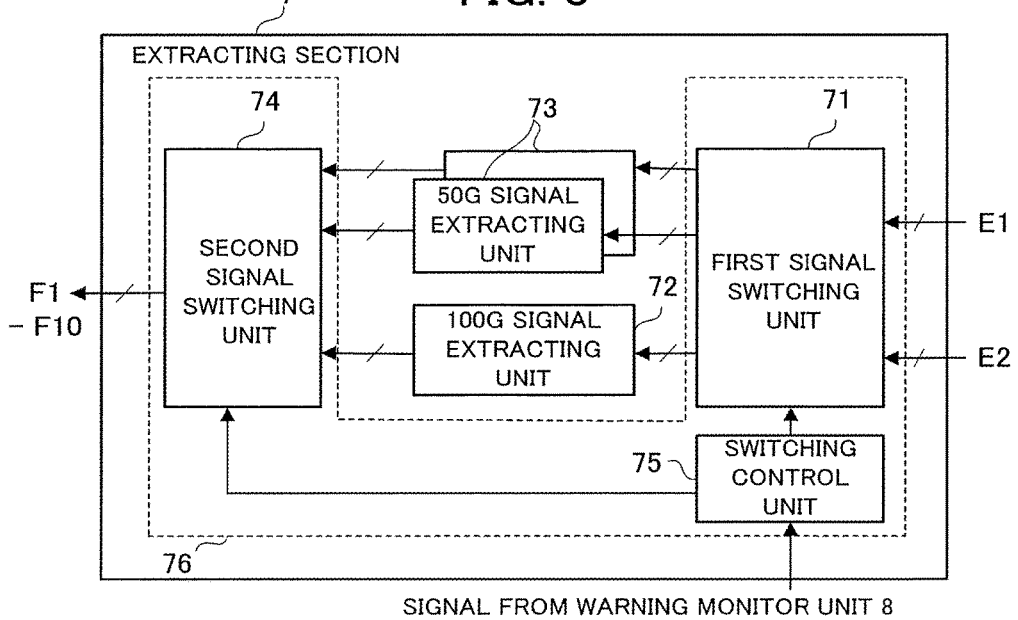
FIG. 3 is a block diagram schematically showing a configuration of an extracting section in FIG. 1.

FIG. 3 is a block diagram schematically showing a configuration of the extracting section 7 in FIG. 1. As shown in FIG. 3, the extracting section 7 includes a first signal extracting unit 72 that extracts the client reception data F1-F10 from the reception electric signals E1 and E2 and outputs the extracted client reception data F1-F10 at the first data transmission rate, a plurality of second signal extracting units 73 each of which extracts the client reception data F1-F5 or F6-F10 from the reception electric signals E1 and E2 and outputs the extracted client reception data F1-F5 or F6-F10 at the second data transmission rate lower than the first data transmission rate, and a reception signal switching section 76. In FIG. 3, the plurality of second signal extracting units 73 are a pair of (i.e., two) signal extracting units 73.

In the first signal extracting unit 72, the first data transmission rate is 100 Gbps. The first signal extracting unit 72 is also referred to as a 100G signal extracting unit 72. In the second signal extracting units 73, the second data transmission rate is 50 Gbps. The second signal extracting units 73 are also referred to as 50G signal extracting units 73. Incidentally, the first data transmission rate and the second data transmission rate are not limited to the above examples. Further, the number of the 50G signal extracting units 73 is not limited to two.

The reception signal switching section 76 includes a first signal switching unit 71, a second signal switching unit 74, and a switching control unit 75.

When both of the carrier signals of the reception optical signals D1 and D2 are in the link-establishable state (that is, when both of the carrier signal having the wavelength λ1 and the carrier signal having the wavelength λ2 are in the link-establishable state), the first signal switching unit 71 supplies the reception electric signals E1 and E2 to the 100G signal extracting unit 72, based on a control signal from the switching control unit 75, and the second signal switching unit 74 outputs the client reception data F1-F10 extracted by the 100G signal extracting unit 72, based on a control signal from the switching control unit 75.

When either of the carrier signals of the reception optical signals D1 and D2 is in the non-link-establishable state (that is, when either the carrier signal having the wavelength λ1 or the carrier signal having the wavelength λ2 is in the non-link-establishable state (abnormal)), the first signal switching unit 71 supplies the reception electric signal E1 to one of the pair of 50G signal extracting units 73 and supplies the reception electric signal E2 to the other one of the pair of 50G signal extracting units 73, based on a control signal from the switching control unit 75. One of the pair of 50G signal extracting units 73 supplied with the reception electric signal (E1 or E2) generated by the optical receiver (5 or 6 in FIG. 1) using one of the carrier signals that is in the link-establishable state extracts the client reception data F1-F5 or F6-F10 as a 50G signal and outputs the extracted client reception data F1-F5 or F6-F10 to the second signal switching unit 74. The second signal switching unit 74 outputs the client reception data F1-F5 or F6-F10, based on a control signal from the switching control unit 75.

<1-2> Operation of First Embodiment

The operation in cases where both of the carrier signals of the reception optical signals D1 and D2 are in the link-establishable state (i.e., in normal times) (that is, when both of the carrier signal having the wavelength $\lambda 1$ and the carrier signal having the wavelength $\lambda 2$ are in the link-establishable state) will be described below. In this case, the data transmission rate by the reception optical signals D1 and D2 is 100 Gbps. Further, the data transmission rate by the transmission optical signals C1 and C2 is 100 Gbps since the carrier signal having the wavelength $\lambda 1$ and the carrier signal having the wavelength $\lambda 2$ are both in the link-establishable state. In FIG. 2, the client transmission data A1-A10 are first inputted to the multiplexing section 2 and outputted by the first signal switching unit 21 to the 100G signal multiplexing unit 22. The client transmission data A1-A10 are multiplexed by the 100G signal multiplexing unit 22 and thereby mapped into the 100G signal having the data transmission rate of 100 Gbps. The 100G signal is divided by the second signal switching unit 24 into the transmission electric signals B1 and B2, which are outputted to the optical transmitters 3 and 4. In the optical transmitters 3 and 4, the transmission electric signals B1 and B2 are respectively converted into the transmission optical signals C1 and C2, which are outputted to transmission channels.

The reception optical signals D1 and D2 inputted to the optical receivers 5 and 6 are respectively converted into the reception electric signals E1 and E2, which are inputted to the extracting section 7. From the reception electric signals E1 and E2, client reception data are separated by the extracting section 7 and outputted as the client reception data F1-F10.

Next, the operation at the time of abnormality (that is, when either the carrier signal having the wavelength $\lambda 1$ or the carrier signal having the wavelength $\lambda 2$ is in the non-link-establishable state) will be described below. In this case, the data transmission rate by the reception optical signals D1 and D2 is 50 Gbps. Further, the data transmission rate by the transmission optical signal C1 and the transmission optical signal C2 is 50 Gbps since either the carrier signal having the wavelength $\lambda 1$ or the carrier signal having the wavelength $\lambda 2$ is in the non-link-establishable state. In regard to the reception optical signal D1, D2 inputted to the optical receiver 5 or the optical receiver 6, the warning monitor section 8 monitors warning signals about effects on the transmission such as reception frame synchronization loss and LOS (Loss of Signal) of frames defined by OTN (Optical Transport Network) or the like as a communication standard. The warning signals include (1) FDI (Forward Defect Indication) for notifying a downstream-side device of failure detection of a main signal in an opposite device on the upstream side by using an OSC (Optical Supervisory Channel) in a forward direction (the same direction as the transmission direction of the main signal), (2) BDI (Backward Defect Indication) for notifying an opposite device on the upstream side of failure detection in an opposite device on the downstream side by using the OSC in a backward direction (the direction opposite to the transmission direction of the main signal), (3) PMI (Payload Missing Indication) for notifying a downstream-side device of the absence of the main signal from an upstream-side device by using the OSC in the forward direction, and so forth. The warning monitor section 8 notifies the switching control unit 25 of warning detection when a warning signal is detected upon the occurrence of abnormality in the reception optical signal D1 or D2. The switching control unit 25 receiving the notification performs functional block switching in the multiplexing section 2. In FIG. 2, the switching control unit 25 switches the output of the first signal switching unit 21 from the 100G signal multiplexing unit 22 to the 50G signal multiplexing units 23. After the switching, the client transmission data A1-A5 are inputted to one of the pair of 50G signal multiplexing units 23 and the client transmission data A6-A10 are inputted to the other one of the pair of 50G signal multiplexing units 23. The client transmission data A1-A5 and A6-A10 are multiplexed respectively by the 50G signal multiplexing units 23 and mapped into 50G signals. In the multiplexed signals (50G signals) outputted from the 50G signal multiplexing units 23, the multiplexed signal of the client transmission data A1-A5 is outputted from the second signal switching unit 24 to the optical transmitter 3 as the transmission electric signal B1, while the multiplexed signal of the client transmission data A6-A10 is outputted from the second signal switching unit 24 to the optical transmitter 4 as the transmission electric signal B2. The transmission electric signals B1 and B2 are converted into optical signals, which are outputted respectively as the transmission optical signal C1 having the wavelength $\lambda 1$ and the transmission optical signal C2 having the wavelength $\lambda 2$.

The switching is performed also on the receiving side in a similar manner. When a warning is detected at the time of the occurrence of abnormality, the warning monitor section 8 notifies the switching control unit 75 of the occurrence of the abnormality. The reception electric signals E1 and E2 outputted from the optical receiver 5 and the optical receiver 6 are outputted by the signal switching unit 71 both to the 100G signal extracting unit 72 in normal times, but are respectively outputted to the 50G signal extracting units 73 at the time of warning detection. In this case, from the reception electric signal outputted from the optical receiver 5 or 6 receiving the reception optical signal, in which the abnormality has occurred, the client reception data are not extracted, since the client reception data extracting process is not normally performed in the 50G signal extracting unit 73. In contrast, from the reception electric signal outputted from the optical receiver 5 or 6 to which the normal reception optical signal is inputted, the client reception data F1-F5 or F6-F10 is outputted. Therefore, the electric signal extracted by one of the pair of 50G signal extracting units 73 is outputted from the second signal switching unit 74 as the client reception data F1-F5 or F6-F10.

Figure 4:
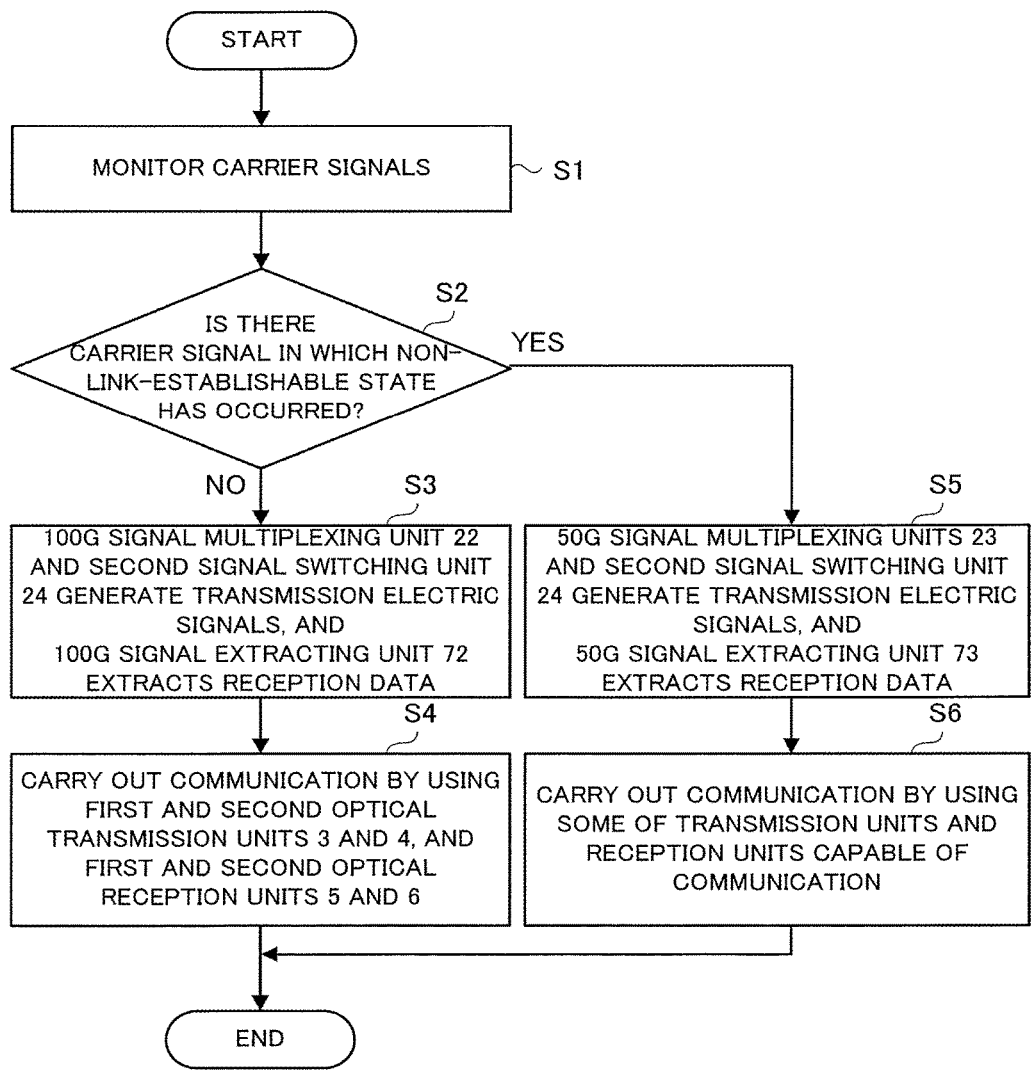
FIG. 4 is a flowchart showing a principal process of a signal transmission method according to the first embodiment.

FIG. 4 is a flowchart showing a principal process of a signal transmission method according to the first embodiment. The signal transmission method according to the first embodiment includes a multiplexing step of multiplexing the transmission data A1-A10 and thereby generating the transmission electric signals B1 and B2, a conversion step of generating the transmission optical signals C1 and C2 respectively including carrier signals having wavelengths different from each other by using the transmission electric signals B1 and B2, a conversion step of generating the reception electric signals E1 and E2 from the reception optical signals D1 and D2 respectively including carrier signals having wavelengths different from each other, an extracting step of extracting the reception data F1-F10 from the reception electric signals E1 and E2, and a monitoring step of monitoring whether or not any of the plurality of carrier signals is in the non-link-establishable state (step S1). Subsequently, the warning monitor section 8 monitors whether or not there is a carrier signal that has fallen into the non-link-establishable state (step S2).

When there is no carrier signal that has fallen into the non-link-establishable state and all the carrier signals are in the link-establishable state (NO in the step S2), the 100G signal multiplexing unit 22 multiplexes the client transmission data A1-A10 and the second signal switching unit generates the transmission electric signals B1 and B2 by dividing the multiplexed signal. Further, the 100G signal extracting unit 72 extracts the reception data from the reception electric signals E1 and E2 (step S3). Thereafter, the optical signals C1 and C2 are transmitted from the first and second optical transmitters 3 and 4 and the optical signals D1 and D2 are received by the first and second optical receivers 5 and 6 (step S4).

When there is a carrier signal in the non-link-establishable state (YES in the step S2), the pair of 50G signal multiplexing units 23 respectively multiplex the client transmission data A1-A5 and A6-A10 and the second signal switching unit generates the transmission electric signals B1 and B2. Further, the 50G signal extracting units 73 extract the client reception data F1-F5 or F6-F10 from the reception electric signal E1 or E2 received normally (step S5). Thereafter, communication is carried out by one or more optical transmitters and optical receivers being capable of communication among the first and second optical transmitters 3, 4 and the first and second optical receivers 5, 6 (step S6).

Incidentally, in cases where an abnormality of an optical signal is detected in an opposite device communicating with the transponder 1 of the first embodiment, even when the BDI (Backward Defect Indication) issued from the opposite device is detected by the warning monitor section 8 of the host device, the input destination of the client transmission data in the multiplexing section 2 is switched from the 100G signal multiplexing unit 22 to the 50G signal multiplexing units 23 by the first signal switching unit 21 controlled by the switching control unit 25. Further, in the extracting section 7, the input destination of the reception electric signals is switched from the 100G signal extracting unit 72 to the 50G signal extracting units 73 by the signal switching unit 71 controlled by the switching control unit 75. Accordingly, the reception electric signal E1 generated by the optical receiver 5 is inputted to one of the 50G signal extracting units 73, the reception electric signal E2 generated by the optical receiver 6 is inputted to the other one of the 50G signal extracting units 73, and the electric signal extracted from the reception electric signal E1 or E2 received normally is outputted as the client reception data F1-F5 or the client reception data F6-F10.

Further, when the switching of the multiplexing method or the extracting method has occurred in an opposite device, it is necessary for the host device (transponder 1) to perform switching in a similar manner in order to carry out communication with the opposite device.

<1-3> Effects of First Embodiment

Figure 5:
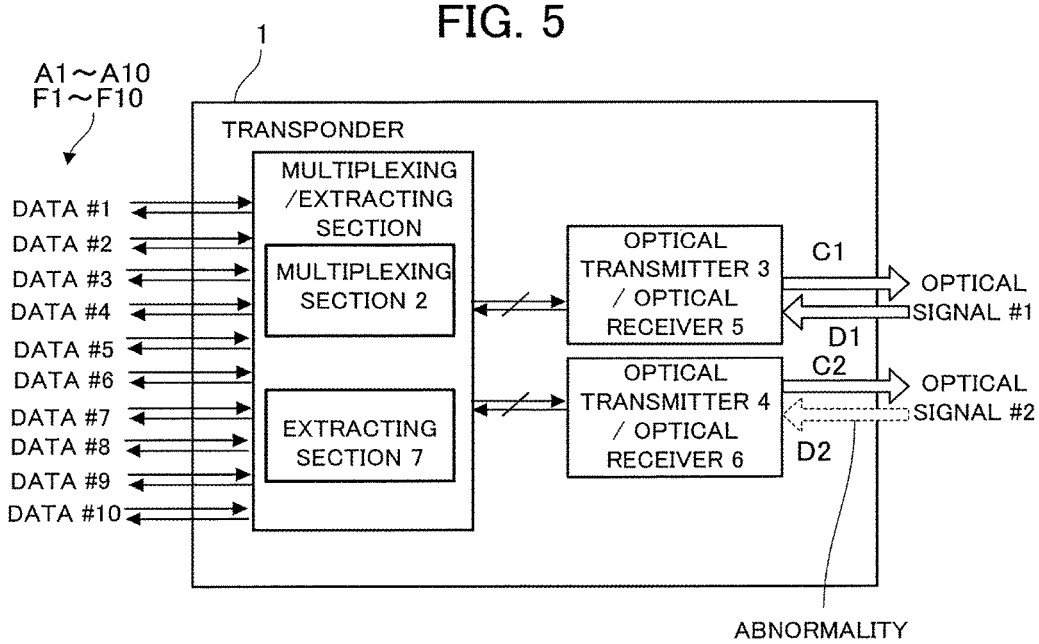
FIG. 5 is a diagram showing a non-link-establishable state in the transponder.
Figure 6:
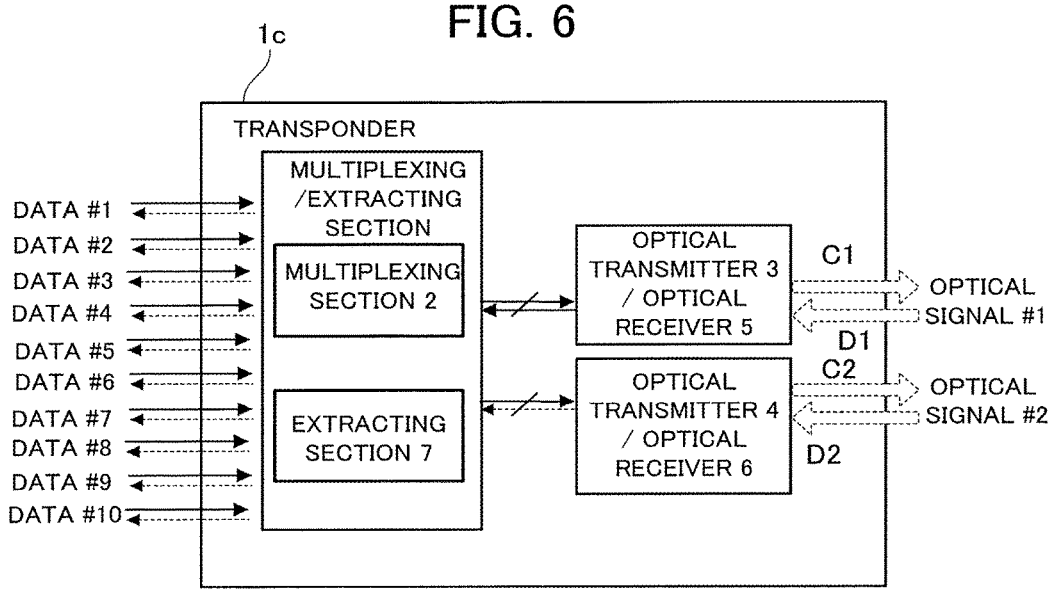
FIG. 6 is a diagram showing status of a transponder as a comparative example when the non-link-establishable state shown in FIG. 5 has occurred.
Figure 7:
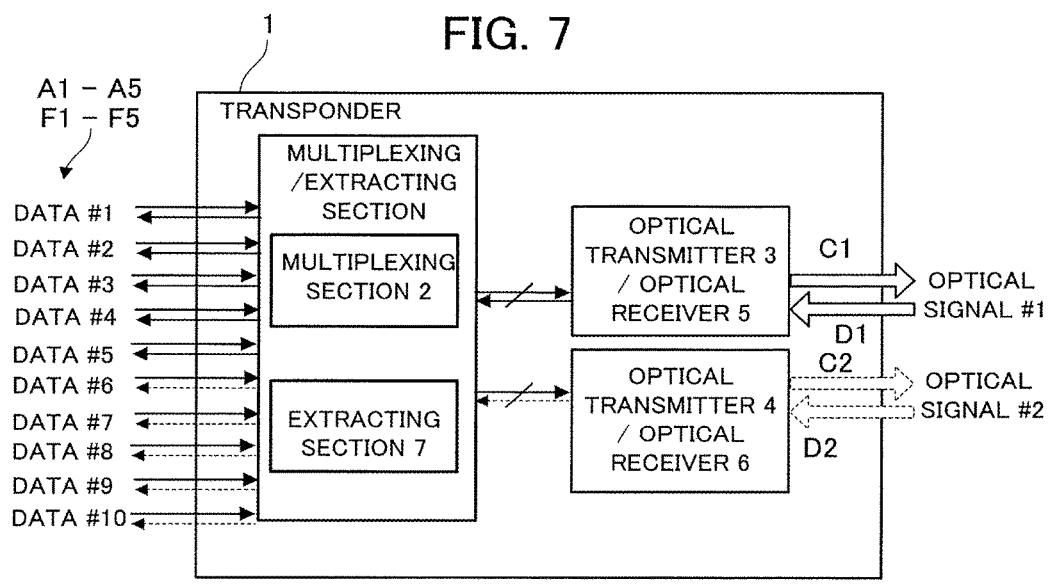
FIG. 7 is a diagram showing status of the transponder according to the first embodiment when the non-link-establishable state shown in FIG. 5 has occurred.

FIG. 5 is a diagram showing a non-link-establishable state in the transponder 1. FIG. 6 is a diagram showing status of a transponder 1c as a comparative example when the non-link-establishable state shown in FIG. 5 has occurred. FIG. 7 is a diagram showing status of the transponder 1 according to the first embodiment when the non-link-establishable state shown in FIG. 5 has occurred. When an abnormality (e.g., reception optical signal D2 indicated by a broken line arrow) is detected in one transmission/reception unit (optical transmitter and optical receiver) among a plurality of optical transmission/reception units (multi-carriers) as shown in FIG. 5, the transponder 1c in FIG. 6 as the comparative example is incapable of normally extracting the reception data of data #1-#10 from the reception optical signals D1 and D2 (e.g., data indicated as the data #1-#10 by leftward broken line arrows in FIG. 6). Further, since the abnormality occurs in the carrier signal of the optical signal #2, the data #1-#10 to be transmitted are not normally converted into an optical signal in the transmission optical signal C2. Therefore, the opposite device receiving the transmission optical signals C1 and C2 cannot normally extract the transmission data of the data #1-#10 from the transmission optical signals C1 and C2. In contrast, in the first embodiment, even when an abnormality (e.g., D2 indicated by the broken line arrow) is detected in one transmission/reception unit among a plurality of optical transmission/reception units (multi-carriers) as shown in FIG. 5, the transmission/reception of optical signals is partially continued (the optical signals C1 and D1 are continued) and the transmission/reception of data is partially continued (the data #1-#5 are continued) as shown in FIG. 7.

As above, the switching of the multiplexing method (switching from the 100G signal multiplexing unit 22 to the 50G signal multiplexing units 23) upon the occurrence of abnormality enables the normal optical transmission/reception unit to continue the transmission of the traffic. Accordingly, the range of extension of abnormality can be made smaller and the reliability of the signal transmission device can be increased.

Thus, even when an abnormality occurs in the carrier signal (wavelength: $\lambda 2$) of the reception optical signal D2, for example, the client reception data F1-F5 transmitted by the carrier signal (wavelength: $\lambda 1$) of the other reception optical signal D1 can be saved.

<1-4> Modification of First Embodiment

Incidentally, when an abnormality in a reception optical signal is detected, it is also possible to perform the switching of the extracting section 7 only in the extracting section 7 on the receiving side while the normal signal transmission is carried out without switching the multiplexing method in the multiplexing section 2 on the transmitting side. In this case, the opposite device detects the BDI and switches the multiplexing unit in the multiplexing section 2 on the transmitting side without switching the extracting method in the extracting section 7 on the receiving side.

Further, performing the switching of the multiplexing method in the multiplexing section 2 and the switching of the extracting method in the extracting section 7 at the same time has an effect of restraining instantaneous interruption of a client signal caused by signal switching.

While the case of using ten client signals and two multi-carriers in 100G transmission has been described here, this embodiment is applicable not only to 100G transmission, ten client signals and two multi-carriers but also to other configurations of multi-carrier communication.

<2> Second Embodiment

<2-1> Configuration of Second Embodiment

Figure 8:
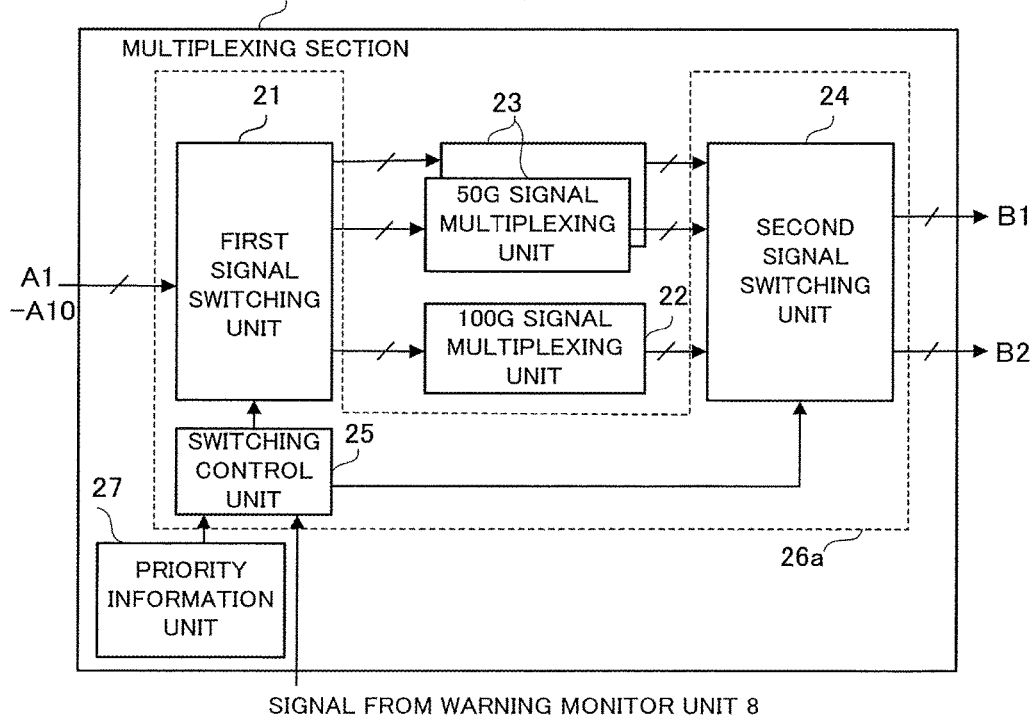
FIG. 8 is a block diagram schematically showing a configuration of a multiplexing section of a transponder as a signal transmission device according to a second embodiment of the present invention.

FIG. 8 is a block diagram schematically showing a configuration of a multiplexing section 2a of a transponder as a signal transmission device according to a second embodiment of the present invention. In FIG. 8, constitutional elements that are the same as or correspond to those shown in FIG. 2 are indicated by the same reference characters shown as in FIG. 2.

As shown in FIG. 8, the multiplexing section 2a includes a 100G signal multiplexing unit (first multiplexing unit) 22 that multiplexes ten pieces of 10 Gbps client transmission data A1-A10 and outputs the multiplexed signal at a first data transmission rate, a plurality of 50G signal multiplexing units (second signal multiplexing units) 23 that multiplex the client transmission data A1-A10 and output the multiplexed signals at a second data transmission rate lower than the first data transmission rate, a transmission signal switching section 26a, and a priority information unit 27 that holds information regarding signals to be protected with high priority. When an abnormality is detected by the warning monitor section 8, the priority information unit 27 supplies information for notifying of which data is data that should be transmitted with high priority. For example, the priority information unit 27 includes a storage unit that supplies data that should be transmitted with high priority, an information receiver that receives data that should be transmitted with high priority, a user operation unit that receives the input of data that should be transmitted with high priority, and so forth.

The transmission signal switching section 26a includes a first signal switching unit 21, a second signal switching unit 24 and a switching control unit 25.

When a warning is detected at the time of the occurrence of abnormality, the electric signals are controlled in the multiplexing section 2 so that the client transmission data with high priority is multiplexed in a signal transmitted by an optical transmitter in which no abnormality has occurred.

<2-2> Operation of Second Embodiment

Figure 9:
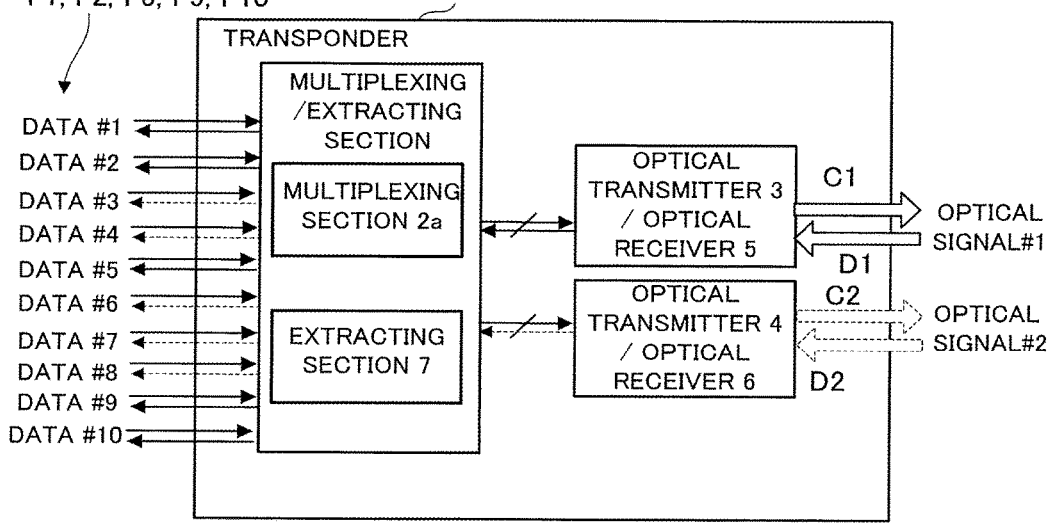
FIG. 9 is a diagram showing status of the transponder according to the second embodiment when the non-link-establishable state shown in FIG. 5 has occurred.

FIG. 9 is a diagram showing status of the transponder 1a according to the second embodiment when the non-link-establishable state shown in FIG. 5 has occurred. For example, it is assumed here that an abnormality in the optical receiver 5 is detected by the warning monitor section 8 when the client transmission data A9 and A10 (data #9, #10) among the ten pieces of client transmission data A1-A10 are desired to be protected with high priority. The priority information unit 27 holds Information on the high priority protection of the client transmission data A9 and A10 (data #9, #10), the switching control unit 25 according to the information controls the first signal switching unit 21 so as to output the client transmission data A9 and A10 (data #9, #10) to the optical transmitter 3 using the carrier signal having the wavelength regarding which no abnormality has been detected, and the client signals are outputted to the 50G signal multiplexing units 23. For example, the client transmission data A1, A2, A5, A9 and A10 are inputted to one of the pair of 50G signal multiplexing units 23 and the multiplexed signal is outputted by the second signal switching unit 24 to the optical transmitter 3.

<2-3> Effects of Second Embodiment

Previously making the setting of a signal desired to be protected by the above method has an effect in that traffic of transmission data having high importance can be transmitted with high priority.

Further, it is also possible to discriminate between client signals currently used and client signals not currently used and save the currently used client signals with high priority.

<2-4> Modification of Second Embodiment

Incidentally, similarly to the first embodiment, while the case of using ten client signals and two multi-carriers in 100G transmission has been described here, this embodiment is applicable not only to 100G transmission, ten client signals and two multi-carriers but also to other configurations of multi-carrier communication.

<3> Other Modifications

Figure 10:
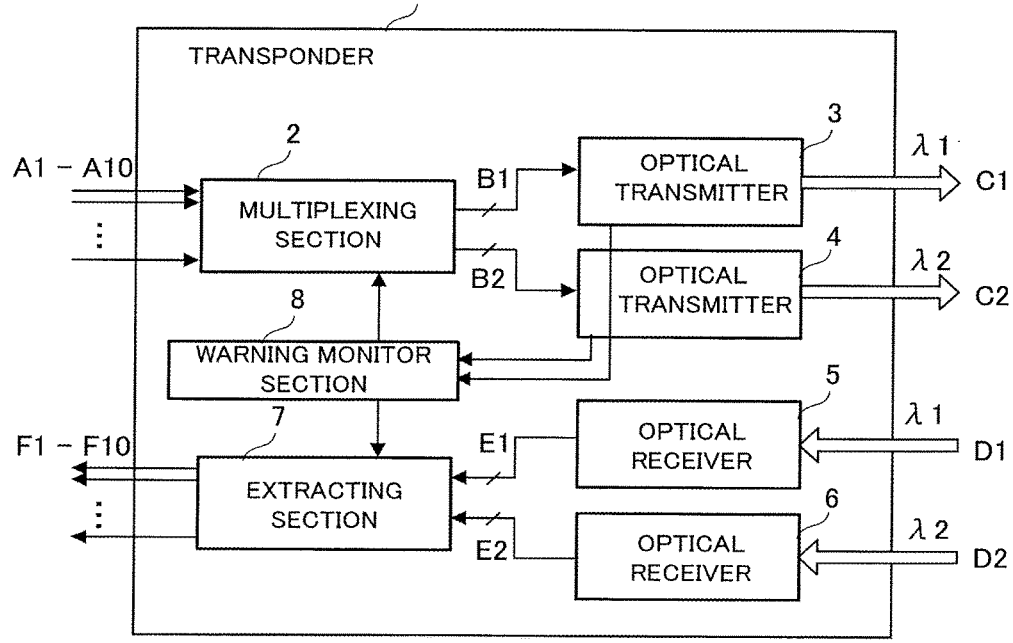
FIG. 10 is a block diagram schematically showing a configuration of a transponder according to a modification of the first embodiment of the present invention.

FIG. 10 is a diagram schematically showing a configuration of a transponder 1b as a signal transmission device according to a modification of the first embodiment of the present invention. In FIG. 10, constitutional elements that are the same as or correspond to those shown in FIG. 1 are indicated by the same reference characters shown as in FIG. 1.

In FIG. 1, the warning monitor section 8 employs a configuration in which a notification signal (abnormality notification signal) for notifying of the carrier signal of one of the reception optical signals D1 and D2 that is in the non-link-establishable state is sent to the extracting section 7 (switching control unit 75 shown in FIG. 3) and the multiplexing section 2 (switching control unit 25 shown in FIG. 2) when either of the reception optical signals D1 and D2 respectively including carrier signals (a plurality of carrier signals) having wavelengths different from each other is in the non-link-establishable state. In contrast, in FIG. 10, the warning monitor section 8 monitors the optical transmitters 3 and 4 and employs a configuration in which a notification signal (abnormality notification signal) for notifying of the carrier signal of a transmission optical signal as one of the transmission optical signals C1 and C2 that is in the non-link-establishable state is sent to the extracting section 7 (switching control unit 75 shown in FIG. 3) and the multiplexing section 2 (switching control unit 25 shown in FIG. 2) when either of the transmission optical signals C1 and C2 including carrier signals (a plurality of carrier signals) having wavelengths different from each other is abnormal (in the non-link-establishable state). Except for this point, the transponder 1b shown in FIG. 10 is the same as the transponder 1 shown in FIG. 1.

It is also possible to apply the configuration shown in FIG. 10 to the transponder of the second embodiment by setting the optical transmitters 3 and 4 as the targets of the monitoring by the warning monitor section 8.

DESCRIPTION OF REFERENCE CHARACTERS 1, 1a, 1b: transponder (signal transmission device), 2, 2a: multiplexing section, 3, 4: optical transmitter, 5, 6: optical receiver, 7: extracting section, 8: warning monitor section (monitoring section), 21: first signal switching unit, 22: 100G signal multiplexing unit (first signal multiplexing unit), 23: 50G signal multiplexing unit (second signal multiplexing unit), 24: second signal switching unit, 25: switching control unit, 26, 26a: transmission signal switching section, 27: priority information unit, 71: first signal switching unit, 72: 100G signal extracting unit (first signal extracting unit), 73: 50G signal extracting unit (second signal extracting unit), 74: second signal switching unit, 75: switching control unit, 76: reception signal switching section.

What is claimed is:

1. A signal transmission device comprising:
a plurality of optical receivers that generate reception electric signals from a plurality of reception optical signals respectively including a plurality of carrier signals;
an extracting section that extracts reception data from the reception electric signals; and a monitoring section that sends a notification signal for notifying of a carrier signal in a non-link-establishable state to the extracting section when any of the plurality of carrier signals is in the non-link-establishable state, wherein the extracting section includes:

a first signal extracting unit that extracts the reception data from the reception electric signals at a first data transmission rate when a data transmission rate by the plurality of reception optical signals is the first data transmission rate;

a second signal extracting unit that extracts the reception data from the reception electric signals at a second data transmission rate when the data transmission rate by the plurality of reception optical signals is the second data transmission rate lower than the first data transmission rate; and a reception signal switching section, wherein:

when the plurality of carrier signals of the plurality of reception optical signals are in a link-establishable state, the reception signal switching section supplies the reception electric signals generated by the plurality of optical receivers to the first signal extracting unit and outputs the reception data extracted by the first signal extracting unit, and when any of the plurality of carrier signals of the plurality of reception optical signals is in the non-link-establishable state, the reception signal switching section supplies the reception electric signals generated by the optical receivers using a carrier signal in the link-establishable state among the plurality of carrier signals of the reception optical signals to the second signal extracting unit and outputs the reception data extracted by the second signal extracting unit.

2. The signal transmission device according to claim 1, further comprising:

a multiplexing section that multiplexes transmission data and thereby generates a transmission electric signal; and a plurality of optical transmitters that generate a plurality of transmission optical signals respectively including a plurality of carrier signals by using the transmission electric signal, wherein the multiplexing section includes:

a first signal multiplexing unit that generates the transmission electric signal having the first data transmission rate when a data transmission rate by the plurality of transmission optical signals is the first data transmission rate;

a second signal multiplexing unit that generates the transmission electric signal having the second data transmission rate when the data transmission rate by the plurality of transmission optical signals is the second data transmission rate; and a transmission signal switching section, wherein:

when the plurality of carrier signals of the plurality of reception optical signals are in the link-establishable state, the transmission signal switching section supplies the transmission data to the first signal multiplexing unit, divides the transmission electric signal generated by the first signal multiplexing unit, and supplies the divided transmission electric signals to the plurality of optical transmitters, and when any of the plurality of carrier signals of the plurality of reception optical signals is in the non-link-establishable state, the transmission signal switching section supplies the transmission data to the second signal multiplexing unit and supplies the transmission electric signal generated by the second signal multiplexing unit to one or more of the plurality of optical transmitters.

3. The signal transmission device according to claim 2, wherein when any of the plurality of carrier signals is in the non-link-establishable state, the transmission signal switching section supplies the transmission electric signal generated by the second signal multiplexing unit to one or more optical transmitters using a carrier signal having the same wavelength as a carrier signal in the link-establishable state among the plurality of carrier signals of the plurality of reception optical signals.

4. The signal transmission device according to claim 1, wherein the monitoring section detects the non-link-establishable state of any of the plurality of carrier signals of the plurality of reception optical signals by monitoring the plurality of optical receivers.

5. The signal transmission device according to claim 2, further comprising a priority information unit that supplies information for notifying of data that should be transmitted with high priority among the transmission data when the non-link-establishable state is detected by the monitoring section.

6. A signal transmission device comprising:

a multiplexing section that multiplexes transmission data and thereby generates a transmission electric signal;

a plurality of optical transmitters that generate a plurality of transmission optical signals respectively including a plurality of carrier signals by using the transmission electric signal; and a monitoring section that sends a notification signal for notifying of a carrier signal in a non-link-establishable state to the multiplexing section when any of the plurality of carrier signals of the plurality of transmission optical signals is in the non-link-establishable state, wherein the multiplexing section includes:

a first signal multiplexing unit that generates the transmission electric signal having a first data transmission rate when a data transmission rate by the plurality of transmission optical signals is the first data transmission rate;

a second signal multiplexing unit that generates the transmission electric signal having a second data transmission rate lower than the first data transmission rate when the data transmission rate by the plurality of transmission optical signals is the second data transmission rate; and a transmission signal switching section, wherein:

when the plurality of carrier signals of the plurality of transmission optical signals are in a link-establishable state, the transmission signal switching section supplies the transmission data to the first signal multiplexing unit, divides the transmission electric signal generated by the first signal multiplexing unit, and supplies the divided transmission electric signals to the plurality of optical transmitters, and when any of the plurality of carrier signals of the plurality of transmission optical signals is in the non-link-establishable state, the transmission signal switching section supplies the transmission data to the second signal multiplexing unit and supplies the transmission electric signal generated by the second signal multiplexing unit to one or more optical transmitters using a carrier signal in the link-establishable state among the plurality of carrier signals.

7. The signal transmission device according to claim 6, further comprising:
a plurality of optical receivers that generate reception electric signals from a plurality of reception optical signals respectively including a plurality of carrier signals; and
an extracting section that extracts reception data from the reception electric signals,
wherein the extracting section includes:
a first signal extracting unit that extracts the reception data from the reception electric signals at the first data transmission rate when the data transmission rate by the plurality of transmission optical signals is the first data transmission rate;
a second signal extracting unit that extracts the reception data from the reception electric signals at the second data transmission rate when the data transmission rate of the plurality of transmission optical signals is the second data transmission rate lower than the first data transmission rate; and
a reception signal switching section,
wherein:
when the plurality of carrier signals of the plurality of transmission optical signals are in the link-establishable state, the reception signal switching section supplies the reception electric signals generated by the plurality of optical receivers to the first signal extracting unit and outputs the reception data extracted by the first signal extracting unit, and
when any of the plurality of carrier signals of the plurality of transmission optical signals is in the non-link-establishable state, the reception signal switching section supplies one or more reception electric signals generated by one or more of the plurality of optical receivers to the second signal extracting unit and outputs the reception data extracted by the second signal extracting unit.

8. The signal transmission device according to claim 6, wherein the monitoring section detects the non-link-establishable state of any of the plurality of carrier signals of the plurality of transmission optical signals by monitoring the plurality of optical transmitters.

9. The signal transmission device claim 6, further comprising a priority information unit that supplies information for notifying of data that should be transmitted with high priority among the transmission data when the non-link-establishable state is detected by the monitoring section.

10. A signal transmission method comprising:
a conversion step of generating reception electric signals from a plurality of reception optical signals respectively including a plurality of carrier signals;
an extracting step of extracting reception data from the reception electric signals; and
a monitoring step of monitoring whether or not any of the plurality of carrier signals is in a non-link-establishable state,
wherein:
when the plurality of carrier signals are in a link-establishable state in the extracting step, the reception data is extracted from the reception electric signals at a data transmission rate equal to a first data transmission rate as a data transmission rate by the plurality of reception optical signals, and
when any of the plurality of carrier signals is in the non-link-establishable state in the extracting step, the reception data is extracted at a second data transmission rate lower than the first data transmission rate, as the data transmission rate by the plurality of reception optical signals.

11. A signal transmission method comprising:
a multiplexing step of multiplexing transmission data and thereby generating a transmission electric signal;
a conversion step of generating a plurality of transmission optical signals respectively including a plurality of carrier signals by using the transmission electric signal; and
a monitoring step of monitoring whether or not any of the plurality of carrier signals is in a non-link-establishable state,
wherein:
when the plurality of carrier signals of the plurality of transmission optical signals are in a link-establishable state in the multiplexing step, the transmission electric signal having a data transmission rate equal to a first data transmission rate as a data transmission rate by the plurality of transmission optical signals is generated, and
when any of the plurality of carrier signals of the plurality of transmission optical signals is in the non-link-establishable state in the multiplexing step, the transmission electric signal having a second data transmission rate lower than the first data transmission rate, as the data transmission rate by the plurality of transmission optical signals, is generated.

* * * * *